United States Patent
Trahan

[11] 3,871,856
[45] Mar. 18, 1975

[54] SELF-ALIGNING BAFFLE AND BLOWHEAD ASSEMBLY

[75] Inventor: Albert J. Trahan, Vernon, Conn.

[73] Assignee: Emhart, Bloomfield, Conn.

[22] Filed: Oct. 11, 1973

[21] Appl. No.: 400,432

[52] U.S. Cl.................................... 65/261, 65/300
[51] Int. Cl.............................................. C03b 9/00
[58] Field of Search ............ 65/262, 261, 264, 314, 65/300, 301

[56] References Cited
UNITED STATES PATENTS

| | | | |
|---|---|---|---|
| 1,080,168 | 12/1913 | Rau | 65/264 |
| 1,957,410 | 5/1934 | Miller, Jr. | 65/261 X |
| 3,236,620 | 2/1966 | Wiley | 65/262 |
| 3,273,991 | 9/1966 | Denman | 65/314 X |

Primary Examiner—S. Leon Bashore
Assistant Examiner—Frank W. Miga
Attorney, Agent, or Firm—McCormick, Paulding & Huber

[57] ABSTRACT

In a glassware forming machine the baffle or settle blowhead on the blank side, as well as the final blowhead on the blow side of a typical Hartford I. S. machine, must be aligned and mated with the blank, or blow mold respectively, before blow air can be directed into the mold. The blowheads are arranged on a carrier, which is moved into position above the molds, and differences in the vertical heights of the molds, or of the vertical positions of the blowheads, are accommodated within each blowhead and its associated mounting so that an equalized closing force is attainable between the blowhead and its mating mold. In the triple gob configuration disclosed herein each blowhead is provided with an annular piston and air pressure is provided to one side of the piston for achieving a predetermined closing force on each associated blowhead. This closing force is achieved without interfering with the delivery of blow air to the blowhead and thence to the interior of the mold.

4 Claims, 2 Drawing Figures

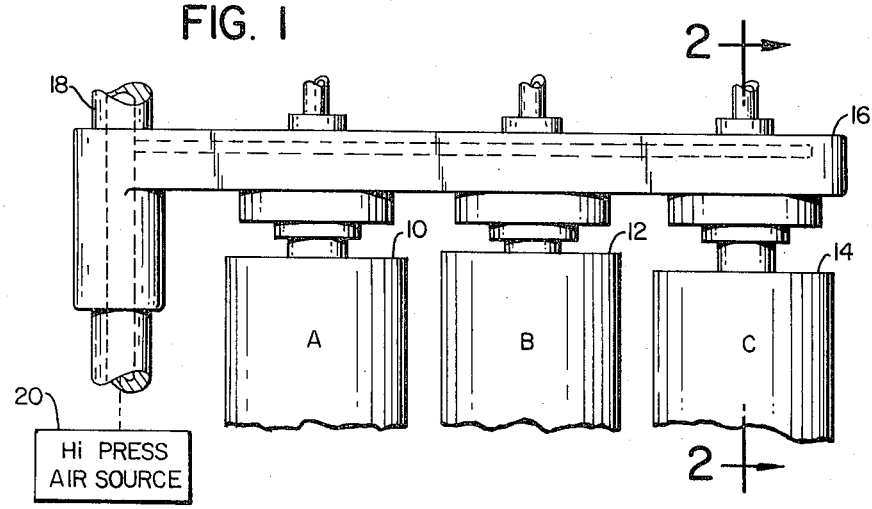
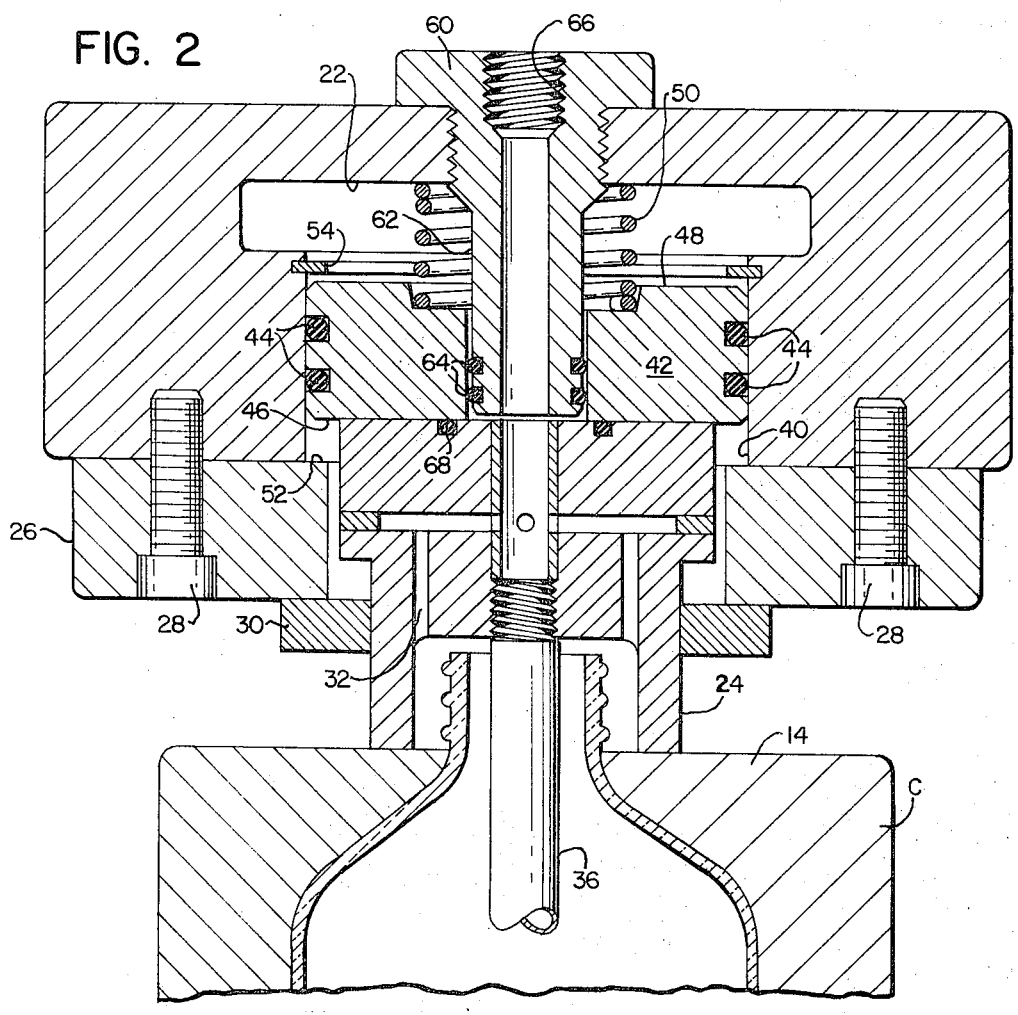

SELF-ALIGNING BAFFLE AND BLOWHEAD ASSEMBLY

SUMMARY OF THE INVENTION

This invention relates generally to the manufacture of glassware in the Hartford I. S. type of glassware forming machine, and deals more particularly with an improved means for mounting the individual blowheads in a carrier so that they can be mated with the individual molds of a multi-gob machine machine section either at the blank or blow mold station in such a machine section. Although the disclosure relates the invention to the blow mold side of such a machine the invention is not so limited might and is also adapted for use on the blank mold side of such a machine section.

In a typical such machine, glass gobs are fed into the open upper ends of inverted blank molds at the blank mold station, suitable neck ring molds being associated with the lower ends of said inverted blank or parison molds and neck pins or the like being adapted to mold the neck or finish portion of the parison. As described in detail in the Ingle U. S. Pat. No. 1,911,119 a settle blowhead is provided on a suitable carrier or arm and is adapted to be lowered into position on top of a funnel which guides the gob when it is initially deposited in the blank mold. The settle blowhead is used to settle the charge into the lower portion of the blank mold, and especially into the neck ring mold itself. The settle blowhead is then raised out of position and the funnel removed, at which time the settle blowhead may again be lowered into position directly onto the blank mold. In this latter position the settle blowhead serves as a baffle for permitting counterblowing or pressing of the parison through the lower neck mold the settle blow air passageways in the settle blowhead or baffle being closed off during this latter portion of the cycle.

A general object of the present invention, therefor, is to provide an improved blowhead carrier wherein the blowheads are independently mounted in the carrier to equalize the forces between the blowheads and the subadjacent individual molds in a multi-gob glassware machine section.

A more specific object of the present invention is to provide an improved blowhead assembly wherein each blowhead has an associated annular piston for exerting a predetermined force on the blowhead, which force is independent of the geometic dimensional considerations between each of the individual blowheads and the subadjacent molds.

BRIEF DESCRIPTION OF THE DRAWINGS

FIG. 1 is an elevational view of a blowhead carrier incorporating the present invention together with its associated support, and also shows three molds of the type normally provided in a triple gob glassware forming machine section.

FIG. 2 is a vertical sectional view taken on the line 2—2 of FIG. 1.

DETAILED DESCRIPTION

Turning now to the drawing in greater detail, FIG. 1 shows three side-by-side final blow molds A, B and C of the type normally provided at the final blow station of a typical Hartford I. S. glassware forming machine section. For purposes of better illustrating the present invention the upper surfaces of these molds A, B and C are illustrated as being not in a common plane, said surfaces, 10, 12 and 14 respectively, being spaced vertically one with respect to another so as to better illustrate the advantages to the present invention. This dimensional difference is of course exaggerated in FIG. 1 for purposes of illustrating the advantages of the present invention, and it will be apparent that in actuality the dimensional differences between these mold surfaces might be very slight. By way of background, it should be noted that if each blowhead were to be provided in a common carrier with nothing but a coil spring arranged to exert a force on the blowhead, that such force might vary from one mold to another as a result of this difference in height between the upper surfaces of the respective molds. The present invention avoids this closing force variation between adjacent molds.

Still with reference to FIG. 1 of the drawing, a blowhead carrier 16 is provided on a support shaft 18, which support shaft is hollow and in connected to a source of high pressure air, for example, on the order of 45 pounds per square inch as indicated schematically at 20. In addition, the support shaft 18 is adapted to be moved vertically by an air actuator cylinder (not shown) and in most cases to be simultaneously rotated on its vertical axis, by action of a cam follower roller is engagement with a suitably contoured helical cam. The reader is referred to the Ingle patent disclosure for a more complete description of this conventional portion of the apparatus depicted in the drawing. Thus, the blowhead carrier 16 is adapted to be moved vertically toward and away from the position shown in FIG. 1, that is toward and away from the upwardly open ends of the side-by-side molds A, B and C.

As shown in FIG. 2 of the drawing the blowhead carrier 16 defines an internal plenum chamber 22, which chamber is in communication with the source of high pressure air 20 as suggested in FIG. 1. A plurality of blowheads are slidably mounted in depending relationship to the blowhead carrier 16, and as shown in FIg. 2 one such blowhead 24 includes a lower annular portion which is adapted to mate with the upper surface 14 of the mold C. Means is provided for retaining the blowhead 24 in position on the underside of the blowhead carrier 16, and preferably said retaining means includes an annular locating ring 26, which ring is fastened to the underside of the blowhead carrier 16 by screws, as indicated generally at 28, 28. Said blowhead retaining means further includes a spring loaded split retaining ring 30, which ring holds the blowhead 24 in centered relationship in the locating ring 26. The blowhead 24 also includes suitable passageways, indicated generally at 32, 34, which passageways serve to equalize the final blow air delivered to the interior of the mold by means of the blow pipe 36.

In accordance with the present invention means is provided for conveying final blow air to the interior of the mold C through passageways defined not only in the blowhead, but also in other apparatus to be described, which final blow air is conveyed to the mold independently of the high pressure air in the plenum chamber 22. As shown in FIG. 2 the blow pipe 36 is threadably received in the blowhead 24, and this portion of the blowhead is of conventional construction, only the upper surface of the blowhead being configured differently than prior art blowheads to accommodate the means for equalizing the force on all of the blowheads in a manner to be described.

The blowhead carrier 16 includes a plurality of cylindrical bores 40, each of which bores is coaxially aligned with the opening defined by the retaining ring 30 associated with the blowhead 24. The bore 40 is provided with an annular piston 42. The piston 42 has suitable sealing means associated with its periphery as indicated generally at 44, 44, and the lower surface 46 of the piston 42 is adapted to engage the upper surface of the blowhead 24 to urge the blowhead downwardly against its associated mold C. High pressure air from the plenum chamber 22 acts against the upper surface 48 of the piston 42 for this purpose. Although not required, a retaining spring 50 may be provided to supplement the force of the air in serving to set the blowhead 24 against the mold C, and where a spring 50 is so used the high pressure air in the plenum chamber 22 may be selectively applied so as to act only when the blowhead carrier arm 16 has reached the position shown in FIG. 1, that is only when it has reached the position where the blowheads mate with the associated molds. It is important to note that the spring 50 is not required where high pressure air is continually available in the plenum chamber 22.

Vertical axial movement of the annular piston 42 in its associated cylindrical bore 40 is limited by upper and lower stop means, which stop means include a lower stop surface 52 defined by the locator ring 26, and an upper stop surface defined by the retaining ring 54. The upper retaining ring 54 acts against the upper peripheral edge of the annular piston 42 whereas the lower stop surface 52 acts against the lower peripheral edge of the piston 42 to define the limits of motion of the annular piston.

In further accordance with the present invention and to further describe the means for introducing final blow air to the interior of the mold, independently of the high pressure air used to seat the blowhead on said mold, FIG. 2 shows an adapter 60 which is threadably received in the upper side of the blowhead carrier 16. Said adapter 60 includes a depending portion extending through the central opening in the annular piston 42. Thus, the adapter 60 has a stem portion 62 which carries suitable sealing means 64, 64 to isolate the final blow air, introduced through the central opening 66 of the adapter 60, from the high pressure air in the plenum chamber 22.

Final blow air is only introduced to this central opening 66 selectively as required to blow the glassware articles in the mold C and therefor further sealing means 68 is provided between the lower surface 46 of the annular piston 42 and the upper surface of the blowhead 24 to prevent final blow air from being vented when the piston 42 has seated as shown in FIG. 2. As so constructed and arranged, final blow air is confined to the central opening 66 in the adapter 60 and thence through the interior of the blowhead 24 to the blow pipe 36. Final blow air then is allowed to escape upwardly between the blow pipe and the neck of the glassware article being formed through the equalizing passageways 32 and 34 and ultimately some of the said final blow air will escape between the mating surfaces of the blowhead 24 and the upper surface 14 of the mold C. However, as a result of the individual equalizing force applied to each of the blowheads 24 in the triple gob configuration shown these surfaces are adapted to mate with one another in such a manner that the escape of such final blow air is minimized, and hence the noise associated with such air is also minimized, an important consideration in the environment of a glass plant.

I claim:

1. In a glassware forming machine of the type having at least two side-by-side upwardly open molds, the upper surfaces of which may not be in the same horizontal plane, the improvement comprising:
   a. a blowhead carrier movable toward away from the upper surfaces of said molds,
   b. a blowhead retaining means mounted to the underside of said blowhead carrier,
   c. a means for providing air under pressure, and said carrier defining an internal plenum chamber communicating therewith,
   d. annular pistons slidably received in side-by-side bores defined in the lower wall of said carrier directly above each of said upwardly open molds,
   e. adapters having depending stem portions, and portions fixed in an upper carrier wall, each of said pistons having a central opening for receiving one of said stem portions, each adapter having an opening extending therethrough, and an annular sealing means between each stem portion and piston opening,
   f. blowheads for mating with each of said upwardly open molds, each blowhead having a depending blowpipe for conveying blow air to the interior of each mold, each blowpipe having an upper end communicating with said adapter opening, and
   g. each piston having its lower surface held in engagement with one of said blowheads as a result of the air pressure in said plenum chamber, said piston and its associated blowhead being urged upwardly against the biasing force offered by said air pressure as said blowhead engages its associated mold.

2. The combination defined in claim 1 further characterized by stop means for limiting the stroke of said annular piston such that said annular sealing means continuously prevents loss of air pressure to said annular pistons.

3. The combination defined in claim 2 wherein said stop means more particularly comprises an upper retaining ring in said blowhead carrier for engaging the upper peripheral edge of said annular piston to stop it against upward movement, said blowhead retaining means defining a lower stop surface for engaging the lower peripheral edge of said annular piston to stop it against downward movement.

4. The combination defined in claim 3 wherein said annular piston is continually urged downwardly toward said lower stop surface by the force of a retaining spring, said spring force being selectively supplemented by air pressure when said blowhead is to be seated against an associated mold and said carrier is moved downwardly as aforesaid.

* * * * *

UNITED STATES PATENT OFFICE
CERTIFICATE OF CORRECTION

Patent No. 3,871,856           Dated   March 18, 1975

Inventor(s)  Albert J. Trahan

It is certified that error appears in the above-identified patent and that said Letters Patent are hereby corrected as shown below:

Col. 1, line 10, delete "machine" second occurrence.

Col. 1, line 14, delete "might".

Col. 1, line 34, insert comma (,) after "mold".

Col. 1, line 47, "geometic" should be --geometric--.

Col. 2, line 19, "in" should be --is--.

Col. 2, line 39, "FIg." should be --Fig.--

Signed and Sealed this twenty-ninth Day of July 1975

[SEAL]

Attest:

RUTH C. MASON
Attesting Officer

C. MARSHALL DANN
Commissioner of Patents and Trademarks